US008122500B2

(12) United States Patent
Dawson et al.

(10) Patent No.: US 8,122,500 B2
(45) Date of Patent: Feb. 21, 2012

(54) TRACKING THE SECURITY ENFORCEMENT IN A GRID SYSTEM

(75) Inventors: Christopher J. Dawson, Arlington, VA (US); Vincenzo V. DiLuoffo, Sandy Hook, CT (US); Craig W. Fellenstein, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 11/426,068

(22) Filed: Jun. 23, 2006

(65) Prior Publication Data

US 2007/0300297 A1 Dec. 27, 2007

(51) Int. Cl.
*H04L 29/06* (2006.01)
(52) U.S. Cl. ......................................................... 726/22
(58) Field of Classification Search .......... 709/201–226; 718/100–108; 726/27–30; 705/8, 11, 50, 705/54, 80
See application file for complete search history.

(56) References Cited

U.S. PATENT DOCUMENTS

| | | | |
|---|---|---|---|
| 5,805,801 A | 9/1998 | Holloway et al. | |
| 6,282,546 B1 | 8/2001 | Gleichauf et al. | |
| 6,968,377 B1 | 11/2005 | Gleichauf et al. | |
| 7,444,522 B1* | 10/2008 | Chang et al. | 713/189 |
| 7,533,170 B2* | 5/2009 | Fellenstein et al. | 709/224 |
| 7,823,185 B1* | 10/2010 | Seaman et al. | 726/1 |
| 2002/0170032 A1* | 11/2002 | Beaven et al. | 717/104 |
| 2003/0208533 A1* | 11/2003 | Farquharson et al. | 709/203 |
| 2004/0034767 A1* | 2/2004 | Robinson et al. | 713/152 |
| 2004/0093381 A1* | 5/2004 | Hodges et al. | 709/204 |
| 2004/0139202 A1* | 7/2004 | Talwar et al. | 709/229 |
| 2004/0181469 A1* | 9/2004 | Saeki | 705/30 |
| 2004/0250125 A1* | 12/2004 | Janson et al. | 713/201 |
| 2005/0050361 A1 | 3/2005 | Miyanaga | |
| 2005/0086197 A1* | 4/2005 | Boubez et al. | 707/1 |
| 2005/0125537 A1* | 6/2005 | Martins et al. | 709/226 |
| 2005/0160318 A1* | 7/2005 | Di Luoffo et al. | 714/25 |
| 2005/0166041 A1* | 7/2005 | Brown | 713/150 |
| 2006/0048157 A1 | 3/2006 | Dawson | |

FOREIGN PATENT DOCUMENTS

WO 2006063881 A1 6/2006

OTHER PUBLICATIONS

Feng Li et al: "A dynamic grid authorization mechanism with result feedback"; Grid and Cooperative Computing—GCC 2004. Third International Conference Proceedings (Lecture Notes in Computer Science vol. 3251) Springer-Verlag Berlin, Germany, 2004, pp. 867-870.

* cited by examiner

*Primary Examiner* — Gilberto Barron, Jr.
*Assistant Examiner* — Shaun Gregory
(74) *Attorney, Agent, or Firm* — Yee & Associates, P.C.; Mark C. Vallone

(57) ABSTRACT

The "Grid Security Monitor" tracks the security status of resources in a grid computer system. When a client submits a job to the grid scheduler, the Grid Security Monitor creates a security contract. The security contract comprises all the security credentials needed to access the resource executing the job, as well as privacy and security requirements. The Grid Security Monitor compares the security status of the resource to the requirements of the security contract. If the security status of the resource changes or violates the security contract, then the Grid Security Monitor notifies the client. The Grid Security Monitor has a user interface that allows the client to perform a manual security validation by asking the grid management system to verify the security status of the resource.

17 Claims, 5 Drawing Sheets

TRACKING THE SECURITY ENFORCEMENT IN A GRID SYSTEM

FIELD OF THE INVENTION

The invention relates generally to multi-computer data transfer, and specifically to computer network monitoring to alert clients to changes in the security status of a resource used to execute a job for the client.

BACKGROUND OF THE INVENTION

Grid computing is about sharing resources located in different places, based on different architectures, and belonging to different management domains. A grid can connect computing centers over multiple continents, enabling client computers to share resources and foster collaboration among the users. A grid provides clients with access to otherwise incompatible resources. The grid management software acts as an interpreter between the communication and security protocols of dissimilar computer systems on the grid.

Grid management software, such as Globus Toolkit®, comprise of a collection of programs and libraries for managing grid resources. The grid management software performs functions such as tracking information about users, projects and available resources, as well as managing security protocols used to establish secure communications between clients and the grid resources. Tracking functions include receiving status updates directly from grid resources and storing status information in logs.

A major functionality of a grid system is the capability to submit jobs to heterogeneous resources. These jobs are binary executables or commands submitted by clients to be run on a remote server. Clients submit jobs to the grid through a piece of grid management software called a scheduler. The scheduler assigns the job to a resource (or set of resources) on the grid. The grid management software uses the client's security credentials to access the chosen grid resource and execute the job. The grid resource authenticates the client's credentials and authorizes execution of the job. "Security delegation" is the term used to describe the grid management software's use of the client's security credentials to access a grid resource. Examples of security credentials include identity (such as user names or account numbers), passwords, certificates and may even include privacy or encryption requirements. Security delegation is required because the grid management software must translate the security credentials into a format compatible with the accessed resource. The security delegation lasts until the job is fully executed and the results are returned to the client.

Security concerns arise for jobs with long time durations. A security compromise on the resource running the job may violate the terms of the security delegation. There is no known method of enforcing the terms of a security delegation after a job begins to execute. A need exists for a system and method of alerting grid clients when a security compromise occurs on a resource executing a job.

SUMMARY OF THE INVENTION

The "Grid Security Monitor" disclosed is a method for tracking the security status of resources in a grid computer system. The Grid Security Monitor notifies clients using grid resources if the security conditions have changed. Clients may use this information to terminate jobs executing on the grid, or to select different resources to perform the same job. When a client submits a job to the grid scheduler, the Grid Security Monitor creates a security contract. The security contract comprises all the security credentials needed to access the resource executing the job, as well as privacy and security requirements. While the resource is executing the job, the resource sends periodic security notifications to the Grid Security Monitor. The Grid Security Monitor compares the security status of the resource to the requirements of the security contract. If the security status of the resource changes or violates the security contract, then the Grid Security Monitor notifies the client. The Grid Security Monitor stores all security notifications in a log accessible by the client. Also, all security notifications can be forwarded to the client, even if there are not changes to the security status of the resource. The Grid Security Monitor has a user interface that allows the client to perform a manual security validation by asking the grid management system to verify the security status of the resource.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Grid Security Monitor"

Figure 1:
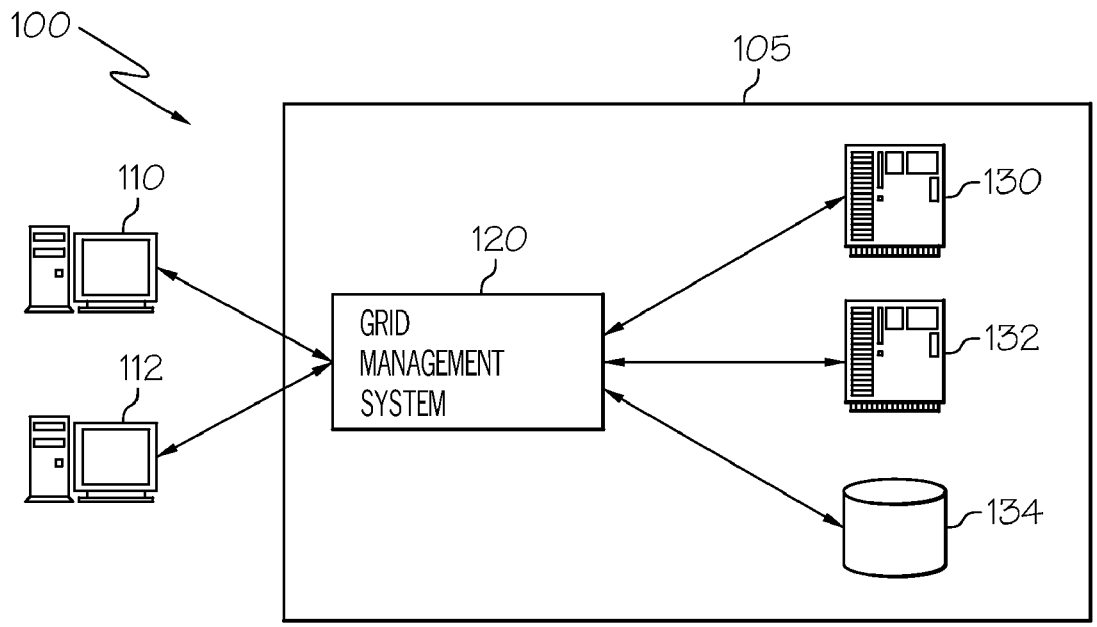
FIG. 1 is an exemplary grid computer network.

Additionally, the "Grid Security Monitor" described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. FIG. 1 depicts exemplary grid computer network 100 comprising "virtual organization" of grid resources and management 105, first client computer 110, and second client computer 112. Grid management system 120 contains the software and hardware necessary to connect the heterogeneous computer systems that make up the grid. Resource 130, resource 132 and resource 134 are exemplary "resources" on the grid that may include computers, servers, other networks or storage devices.

Figure 2:
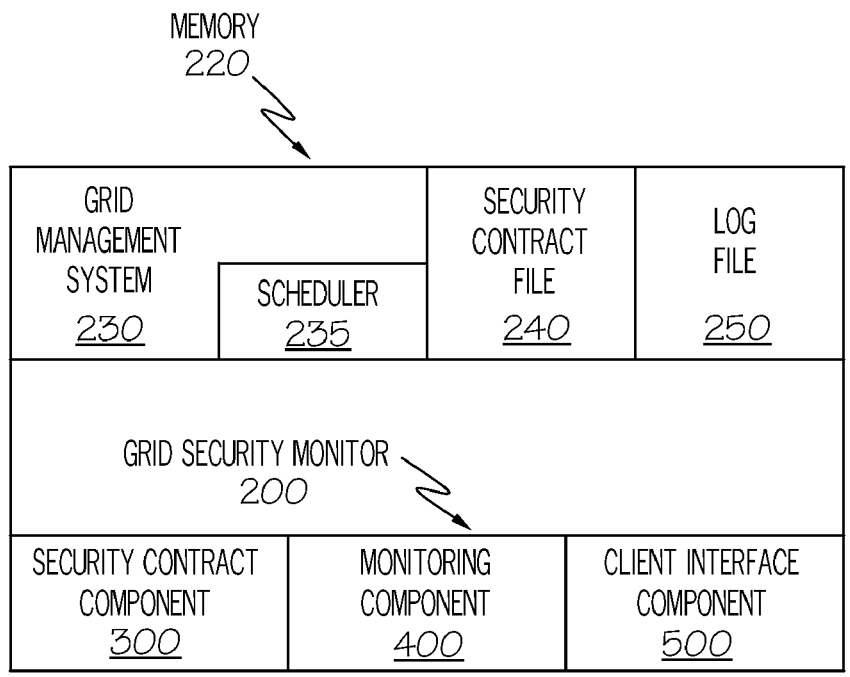
FIG. 2 describes programs and files in a memory on a computer.

The Grid Security Monitor 200 typically is stored in a memory, represented schematically as memory 220 in FIG. 2. The term "memory," as used herein, includes without limitation any volatile or persistent medium, such as a magnetic disk or an optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. Grid Security Monitor 200 comprises Security Contract Component 300, Monitoring Equipment 400, and Client Interface Component 500. As depicted in FIG. 2, though, memory 220 may include additional data and programs. Of particular import to Grid Security Monitor 200, memory 220 may include Grid Management System 230, Scheduler 235, Security Contract File 240 and Log File 250 with which Grid Security Monitor 200 interacts.

Memory 220 contains various files and programs associated with Grid Security Monitor 200. Grid Management System 230 comprises the software necessary to connect and manage communications between the heterogeneous computer systems that make up the grid. Scheduler 235 is a sub-program of Grid Management System 230. Scheduler 235 receives job requests from clients and assigns the job to a resource on the grid. Security Contract File 240 contains security credentials needed to access the resource executing the job, as well as the client's privacy and security requirements. Log File 250 contains a listing of security notifications generated by the resource while executing the job. Security Contract Component 300 creates Security Contract File 240 whenever a client submits a job to the grid. Monitoring Component 400 receives security notifications from the resource executing a job, saves the notifications to a log and enforces the security requirements of security contract 240 by notifying the client of any security status changes on the resource executing the job. Client Interface Component 500 allows clients to validate the current security condition of the resource executing a job and allows the client to review the status notification log.

Figure 3:
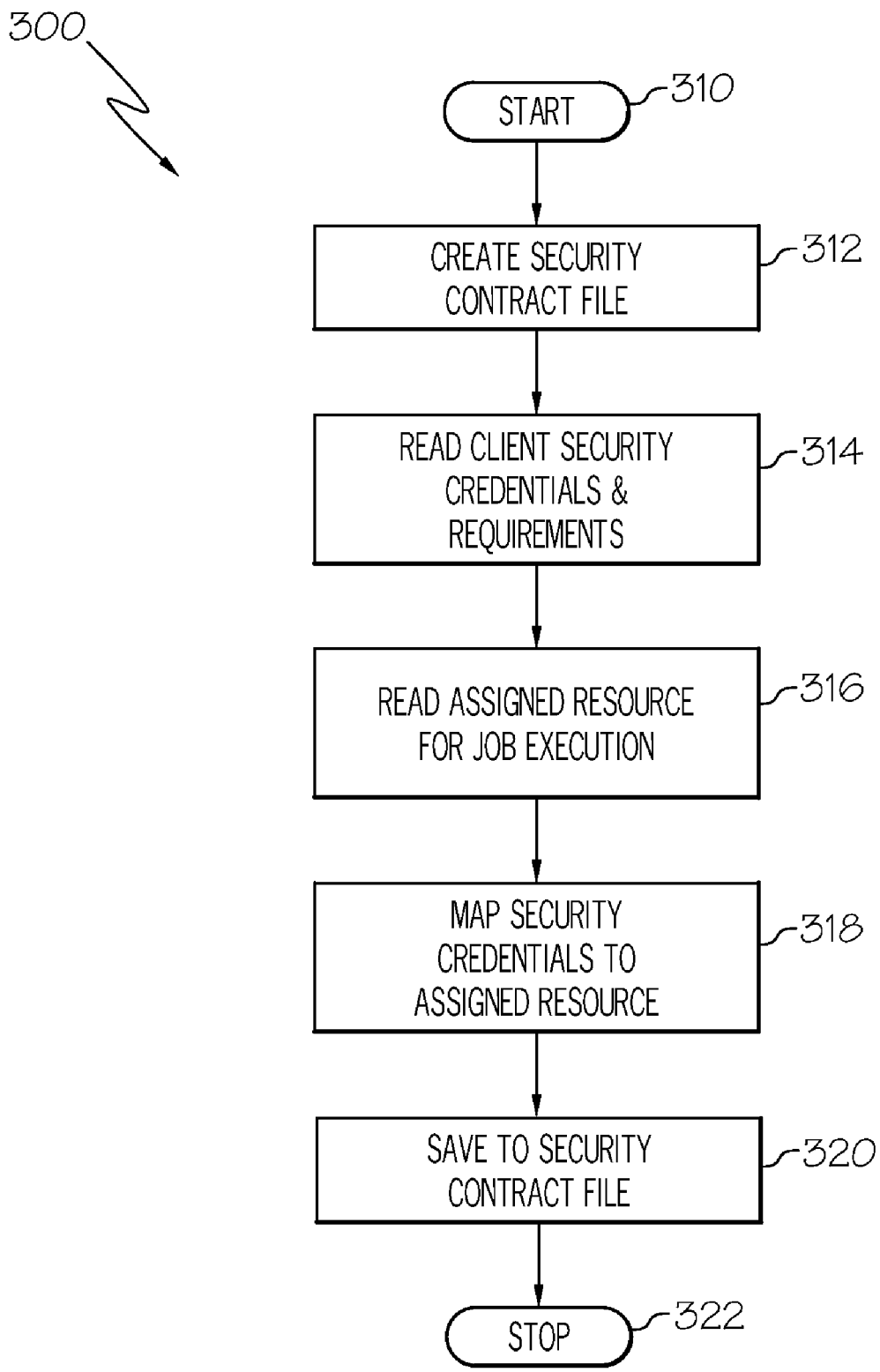
FIG. 3 is a flowchart of a Security Contract Component.

FIG. 3 depicts a flow chart of the logic of Security Contract Component 300. Security Contract Component 300 starts when a new job is assigned by scheduler 235 (310). Security Contract Component 300 creates a new Security Contract File 240 (312) and reads security credentials (such as user name, passwords and permissions) and security requirements (such as a requirement for secured or encrypted connections) from the client (314). Security Contract Component 300 reads the resource assigned by Scheduler 235 to execute the job (316), and maps the client's security credentials to the assigned resource (318). Each resource selected by Scheduler 235 may use different security semantics. Mapping of the client's security credentials includes reformatting the credentials to meet the proper syntax or protocol for the assigned resource. Security Contract Component 300 uses the credential mapping provided by a mapping service integral to Grid Management System 230. Grid Management System 230 may utilize prior art known as an inter-domain mapping service (not shown here) to facilitate reformatting source domain credentials to target domain credentials. Security Contract Component 300 saves the original and mapped security credentials and security requirements to Security Contract File 240 (320) and stops (322).

Figure 4:
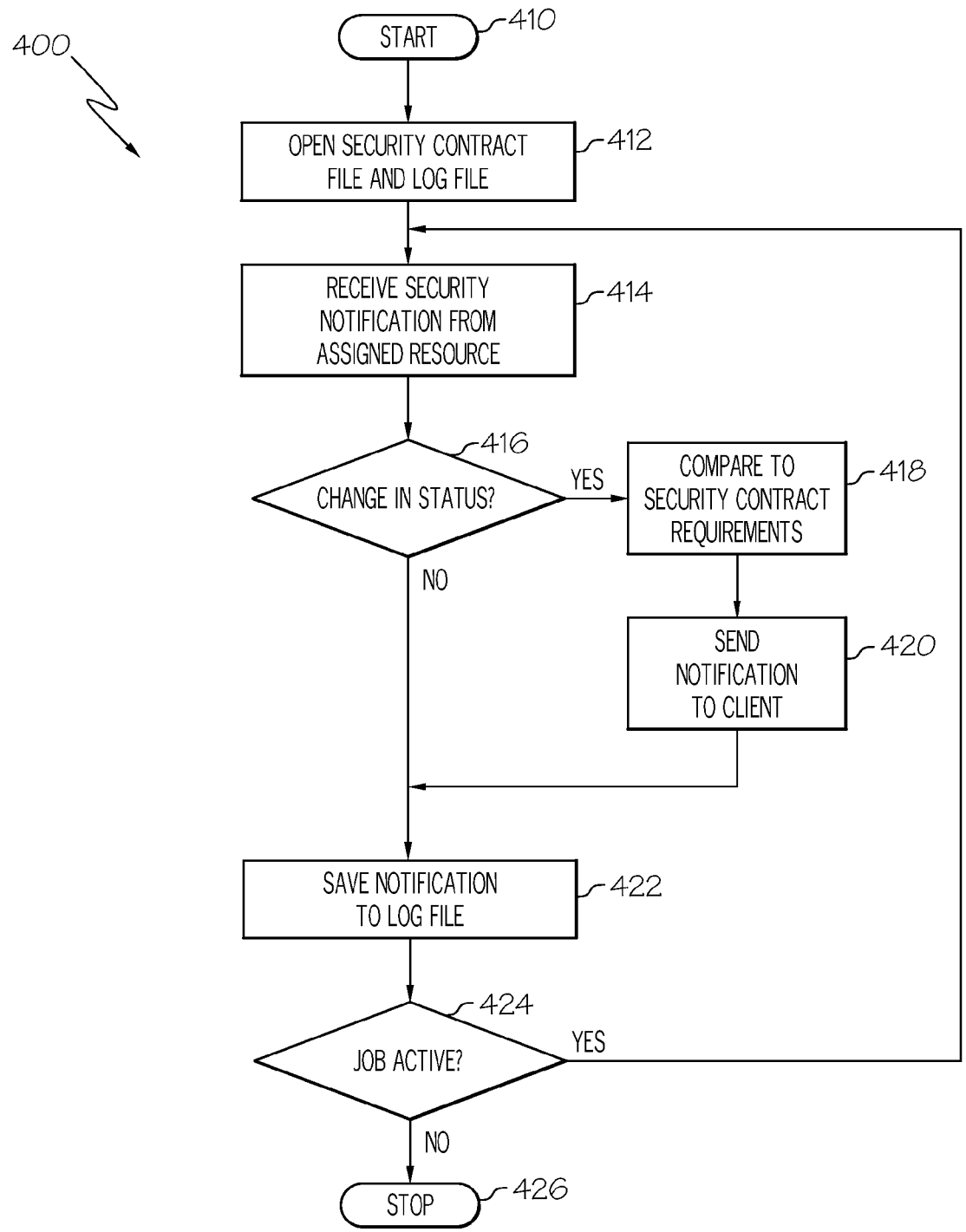
FIG. 4 is a flowchart of a Monitoring Component.

FIG. 4 depicts a flow chart of the logic of Monitoring Component 400. Monitoring Component 400 starts when scheduler 235 dispatches the job for execution on the assigned resource (410), and opens Security Contract File 240 and Log File 250 (412). Monitoring Component 400 receives a security notification message from the assigned resource (414). Security notification messages are a routine grid function and are sent periodically to Grid Management System 230. The security notification messages include information related to the credentials and permissions being used to execute the job, as well as security or privacy state of the connection. If Monitoring Component 400 detects a change in security status (416), Monitoring Component 400 compares the new security status to the requirements in Security Contract File 240 (418) and sends the security notification to the client (420). All security notifications are saved to Log File 250 (422). While the assigned resource actively executes the job (424), Monitoring Component 400 repeats steps 414-422. After the assigned resource completes the job, Monitoring Component 400 stops (426).

Figure 5:
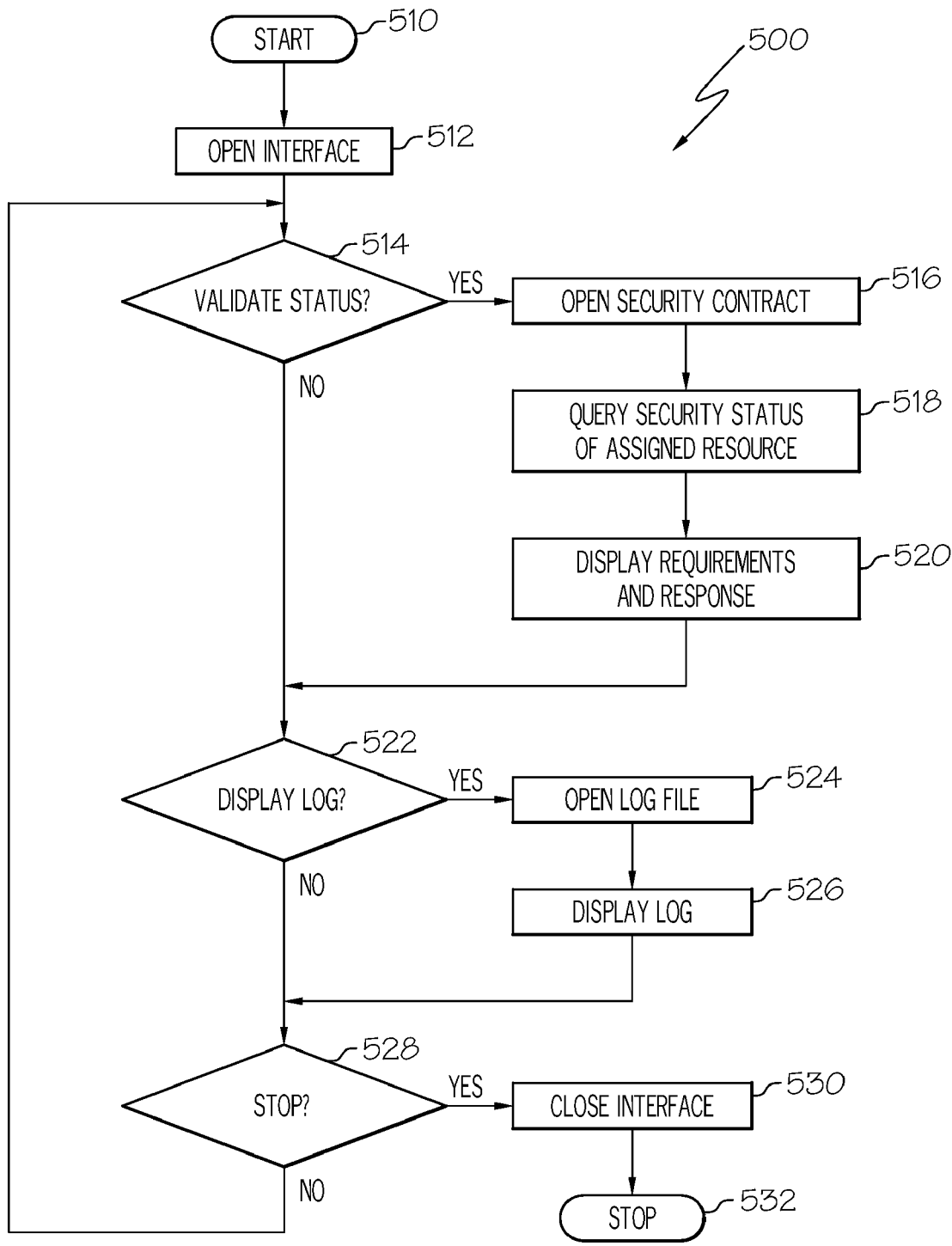
FIG. 5 is a flowchart of a Client Interface Component.

FIG. 5 depicts a flow chart of the logic of Client Interface Component 500. Client Interface Component starts when activated by the client (510) and opens a user interface, such as a window with a command prompt, a toolbar or menu tab (512). If the client chooses to validate the security status of the actively executing job (514), Client Interface Component 500 opens Security Contract File 240 (516). Client Interface Component 500 causes Grid Management System 230 to query the assigned resource for the present security status (518) and displays both the security requirements from Security Contract File 240 and the response from the assigned resource on the user interface (520). If the client chooses to review Log File 250 (522), Client Interface Component 500 opens Log File 250 (524) and displays the contents on the user interface (526). If the client chooses to close the user interface (528), Client Interface Component 500 closes the user interface (530) and stops (532).

Figure 6:
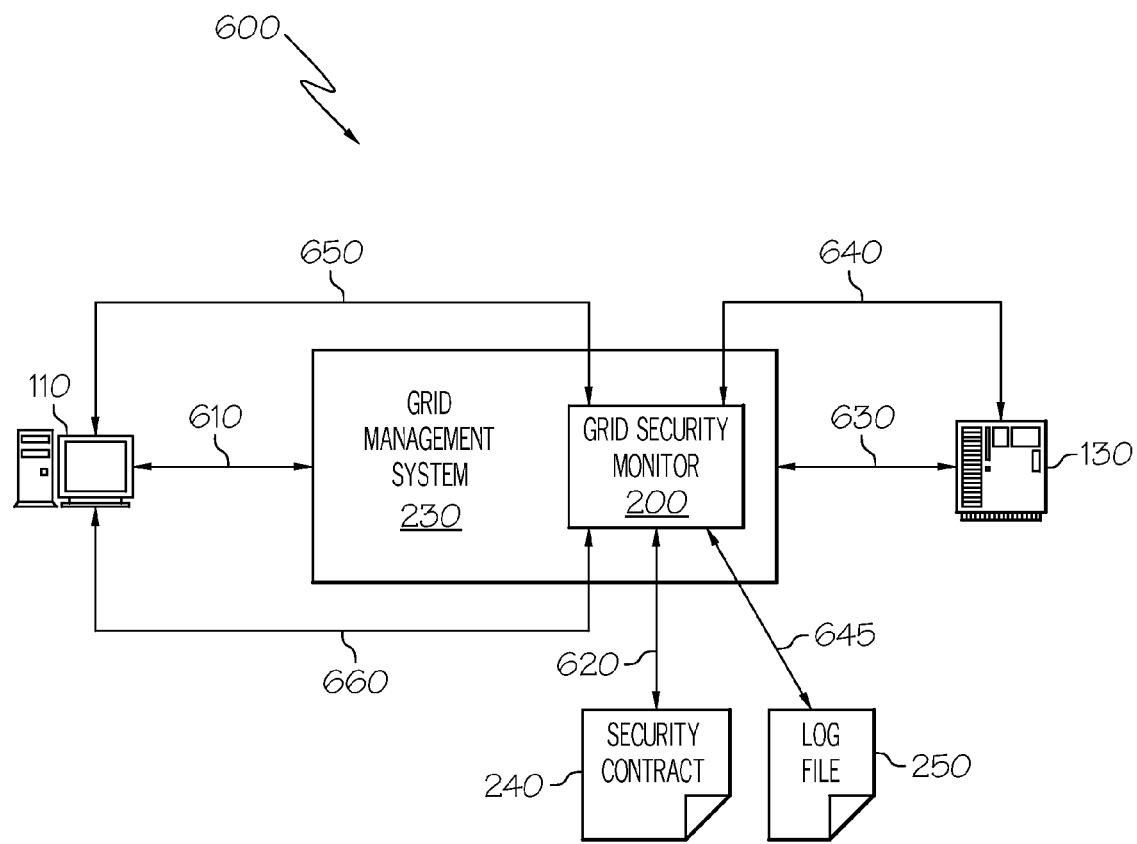
FIG. 6 is a graphical representation of the Grid Security Monitor.

FIG. 6 depicts a graphical representation of the Grid Security Monitor. Arrow 610 represents the steps of Client 110 submitting a job request to Grid Management System 230. These steps include submitting the client's security credentials and security and privacy requirements, as well as mapping security credentials to each resource scheduled to execute the job. Arrow 620 represents creating and saving information Security Contract 240. Arrow 620 also represents accessing and reading the saved information in Security Contract 240. Arrow 630 represents dispatching the job to resource 130 with the security credentials and requirements listed in Security Contract 240. Arrow 640 represents a routine security notification message sent from resource 130 to Grid Management System 230. The contents of the security notification message are compared Security Contract 240 (via Arrow 620) and saved to Log File 250 (via Arrow 645). Arrow 650 represents the Grid Security Monitor 200 forwarding security notification message to client 110. Arrow 660 represents the user interface allowing client 110 to perform a direct security validation of resource 130 (via Arrow 640) or to review Log File 250 (via arrow 645).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for monitoring a security status of a resource on a grid, the method comprising:
   a computer detecting an assignment of the resource to execute a job requested by a client;
   the computer, responsive to detecting the assignment, reading a client security requirement from the client;
   the computer, responsive to reading the client security requirement from the client, mapping the client security requirement to the resource;
   the computer receiving, during an execution of the job requested by the client, a security notification from the resource, the security notification including a permission used to execute the job, a security state of a connection of the resource, and a privacy state of the connection;
   the computer detecting a changed security status of the resource from the security notification;
   the computer determining whether the changed security status violates the client security requirement;
   the computer, responsive to determining that the changed security status violates the client security requirement, sending the security notification to the client of the change; and
   the computer saving the security notification in a log.

2. The method of claim 1, further comprising:
   the computer, responsive to detecting the assignment, reading a client security credential from the client; and
   the computer, responsive to reading the client security credential from the client, mapping the client security credential to the resource.

3. The method of claim 2, wherein the computer mapping the client security credential to the resource comprises the computer reformatting the client security credential to meet a syntax and a protocol for the resource.

4. The method of claim 1, further comprising:
   the computer, responsive to receiving a security validation request from the client, requesting a present security status from the resource;
   the computer receiving a security status notification from the resource; and
   the computer forwarding the security status notification to the client.

5. The method of claim 1, further comprising:
   the computer displaying an interface configured to show one or more of the client security requirement, a security status notification, and the log.

6. A computer program product comprising one or more computer-readable, tangible storage devices and computer-readable program instructions which are stored on the one or more storage devices and when executed by one or more processors, perform the method of claim 1.

7. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

8. A computer system for monitoring a security status of a resource on a grid, the computer system comprising:
   one or more processors, one or more computer-readable memories, and one or more computer-readable, tangible storage devices;
   program instructions, stored on at least one of the one or more storage devices for execution by at least one of the one or more processors via at least one of the one or more memories, to detect an assignment of the resource to execute a job requested by a client;
   program instructions, stored on at least one of the one or more storage devices for execution by at least one of the one or more processors via at least one of the one or more memories, responsive to detecting the assignment, to read a client security requirement from the client;
   program instructions, stored on at least one of the one or more storage devices for execution by at least one of the one or more processors via at least one of the one or more memories, responsive to reading the client security requirement from the client, to map the client security requirement to the resource;
   program instructions, stored on at least one of the one or more storage devices for execution by at least one of the one or more processors via at least one of the one or more memories, to receive, during an execution of the job requested by the client, a security notification from the resource, the security notification including a permission used to execute the job, a security state of a connection of the resource, and a privacy state of the connection;
   program instructions, stored on at least one of the one or more storage devices for execution by at least one of the one or more processors via at least one of the one or more memories, to detect a changed security status of the resource from the security notification;
   program instructions, stored on at least one of the one or more storage devices for execution by at least one of the one or more processors via at least one of the one or more memories, to determine whether the changed security status violates the client security requirement;
   program instructions, stored on at least one of the one or more storage devices for execution by at least one of the one or more processors via at least one of the one or more memories, responsive to determining that the changed security status violates the client security requirement, to send the security notification to the client of the change; and
   program instructions, stored on at least one of the one or more storage devices for execution by at least one of the one or more processors via at least one of the one or more memories, to save the security notification in a log.

9. The computer system of claim 8, further comprising:
   program instructions, stored on at least one of the one or more storage devices for execution by at least one of the one or more processors via at least one of the one or more memories, responsive to detecting the assignment, to reading a client security credential from the client; and
   program instructions, stored on at least one of the one or more storage devices for execution by at least one of the one or more processors via at least one of the one or more memories, responsive to reading the client security credential from the client, to map the client security credential to the resource.

10. The computer system of claim 9, wherein the program instructions to map the client security credential to the resource reformat the client security credential to meet a syntax and a protocol for the resource.

11. The computer system of claim 8, further comprising:
program instructions, stored on at least one of the one or more storage devices for execution by at least one of the one or more processors via at least one of the one or more memories, responsive to receiving a security validation request from the client, to request a present security status from the resource;
program instructions, stored on at least one of the one or more storage devices for execution by at least one of the one or more processors via at least one of the one or more memories, to receive a security status notification from the resource; and
program instructions, stored on at least one of the one or more storage devices for execution by at least one of the one or more processors via at least one of the one or more memories, to forward the security status notification to the client.

12. The computer system of claim 8, further comprising:
program instructions, stored on at least one of the one or more storage devices for execution by at least one of the one or more processors via at least one of the one or more memories, to display an interface configured to show one or more of the client security requirement, a security status notification, and the log.

13. A computer program product for monitoring a security status of a resource on a grid, the computer program product comprising:
one or more computer-readable, tangible storage devices;
program instructions, stored on at least one of the one or more storage devices, to detect an assignment of the resource to execute a job requested by a client;
program instructions, stored on at least one of the one or more storage devices, responsive to detecting the assignment, to read a client security requirement from the client;
program instructions, stored on at least one of the one or more storage devices, responsive to reading the client security requirement from the client, to map the client security requirement to the resource;
program instructions, stored on at least one of the one or more storage devices, to receive, during an execution of the job requested by the client, a security notification from the resource, the security notification including a permission used to execute the job, a security state of a connection of the resource, and a privacy state of the connection;
program instructions, stored on at least one of the one or more storage devices, to detect a changed security status of the resource from the security notification;
program instructions, stored on at least one of the one or more storage devices, to determine whether the changed security status violates the client security requirement;
program instructions, stored on at least one of the one or more storage devices, responsive to determining that the changed security status violates the client security requirement, to send the security notification to the client of the change; and
program instructions, stored on at least one of the one or more storage devices, to save the security notification in a log.

14. The computer program product of claim 13, further comprising:
program instructions, stored on at least one of the one or more storage devices, responsive to detecting the assignment, to reading a client security credential from the client; and
program instructions, stored on at least one of the one or more storage devices, responsive to reading the client security credential from the client, to map the client security credential to the resource.

15. The computer program product of claim 14, wherein the program instructions to map the client security credential to the resource reformat the client security credential to meet a syntax and a protocol for the resource.

16. The computer program product of claim 13, further comprising:
program instructions, stored on at least one of the one or more storage devices, responsive to receiving a security validation request from the client, to request a present security status from the resource;
program instructions, stored on at least one of the one or more storage devices, to receive a security status notification from the resource; and
program instructions, stored on at least one of the one or more storage devices, to forward the security status notification to the client.

17. The computer program product of claim 13, further comprising:
program instructions, stored on at least one of the one or more storage devices, to display an interface configured to show one or more of the client security requirement, a security status notification, and the log.

* * * * *